United States Patent [19]

Cunningham

[11] 4,286,296
[45] Aug. 25, 1981

[54] TRANSDUCER POSITIONING SYSTEM

[75] Inventor: Earl A. Cunningham, Rochester, Minn.

[73] Assignee: International Business Machines Corporation, Armonk, N.Y.

[21] Appl. No.: 108,905

[22] Filed: Dec. 31, 1979

[51] Int. Cl.³ .................. G11B 21/10; G11B 5/58; G11B 17/00
[52] U.S. Cl. ................................................ 360/77
[58] Field of Search ............... 360/77, 78, 75, 97–99

[56] References Cited

U.S. PATENT DOCUMENTS

| 3,404,392 | 10/1968 | Sordello | 360/77 |
| 3,534,344 | 10/1970 | Santana | 360/77 |
| 3,893,180 | 7/1975 | Braun et al. | 360/77 |
| 3,936,876 | 2/1976 | Taylor | 360/78 |
| 3,959,820 | 5/1976 | Braun | 360/77 |
| 4,038,693 | 7/1977 | Huffine et al. | 360/77 |

OTHER PUBLICATIONS

IBM Tech. Disc. Bull., C.N. Wallis, TRI-BIT Servo Pattern, vol. 16, No. 11, Apr. 1974, pp. 3757–3759.

*Primary Examiner*—Alfred H. Eddleman
*Attorney, Agent, or Firm*—Keith T. Bleuer

[57] ABSTRACT

A servo system for centering a transducer over boundaries between adjacent servo tracks on a magnetic disk in which the servo tracks are each formed by alternate long and short magnetic segments, with the short segments in one track being centered with the long segments of adjacent tracks. The servo system includes a frequency doubler circuit for producing a uniform frequency square wave signal of double the fundamental frequency of the analog signal picked up by the transducer from the servo encoding, a filter connected with the transducer for producing an analog double frequency signal based on the analog signal from the transducer, a synchronous detector functioning as a multiplier for multiplying the double frequency square wave signal with the analog double frequency signal from the transducer, and a filter for averaging the resultant pulsating position error signal to provide a steady state position error signal for any particular position of the transducer over a pair of adjacent servo tracks. The steady state position error signal is applied to a servo control and servo actuator for moving the transducer until the steady state position error signal reaches zero which corresponds with the desired centered position of the transducer over the boundary between a pair of adjacent servo tracks.

17 Claims, 8 Drawing Figures

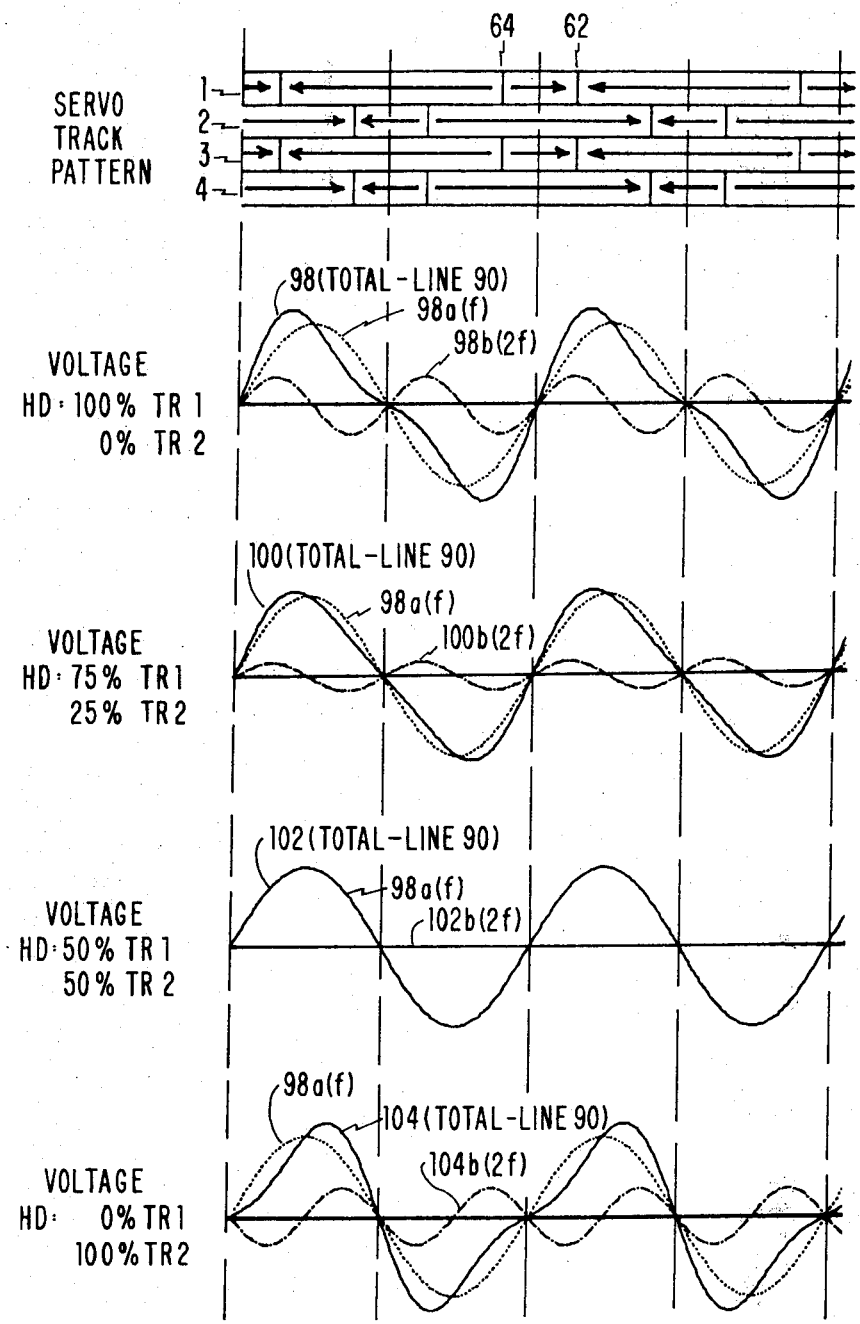
FIG. 6-A

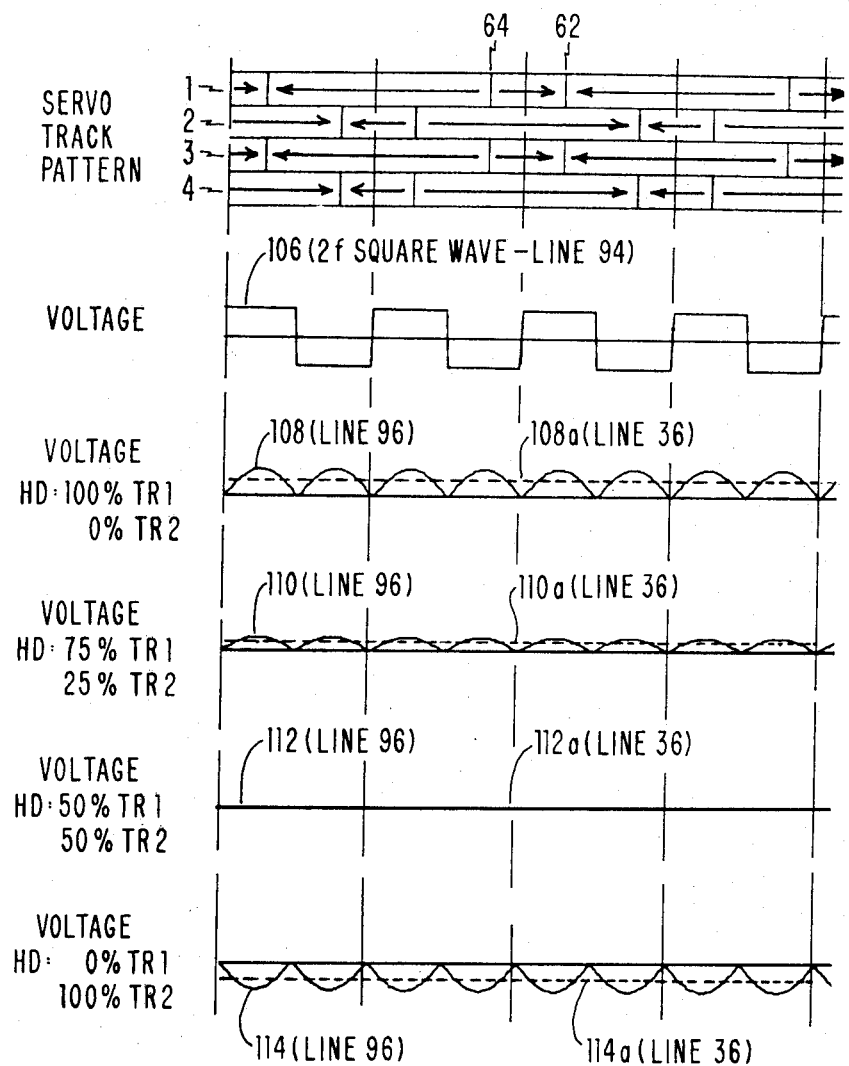
FIG. 6-B

TRANSDUCER POSITIONING SYSTEM

BACKGROUND OF THE INVENTION

The invention relates to the positioning of a transducer over a magnetic medium and in particular over a data track on a magnetic disk through the detection of previously recorded position or servo information.

Such position information may comprise a so-called "tri-bit" servo pattern including magnetically encoded circular tracks on the magnetic disk having a transducer in close proximity therewith for detecting the information carried by the tracks. Circuitry connected with the transducer provides a position error signal (P.E.S.) of different value depending on the position of the transducer with respect to the magnetic tracks, and this position error signal is supplied to servo actuator and control mechanism for moving the transducer into a particular desired position with respect to the tracks. In this position, the transducer corresponds with a data track that is either detected by this transducer or a transducer mechanically connected with and movable with this transducer, so that the data may be read from the data track (or fresh data may be written on this data track) in this position of the transducer.

The tri-bit servo pattern is disclosed in the IBM Technical Disclosure Bulletin publication of April 1974, pages 3757-3759 and comprises magnetic patterns, portions or segments encoded on a magnetic disk in concentric tracks. The magnetic segments are in pairs or long and short segments, and the ends of long and short segments on alternate tracks are disposed on the same radius or radial line of the disk. The long and short segments are magnetically encoded the same along this radius or radial line and thus provide magnetic flux reversals circularly on each track. A servo transducer positioned over the tracks experiences flux reversals as each junction between magnetic segments passes the transducer gap, and the polarity and amplitude of the resulting pulse vary with the polarity and amplitude of the flux reversal causing them.

The circuitry connected with the servo transducer and producing a position error signal generally includes peak detection circuits for determining the relative amplitudes of the peaks of the signal from the servo tranducer and in one way or another comparing these amplitudes so as to determine whether the servo transducer (and the data transducer if this is a separate transducer) is aligned with the desired data track. In order that the relative amplitudes of the servo peaks may be accurately determined, these peaks should be spaced time-wise with disk rotation so that they do not interfere with each other and so that the leading and trailing ends of the peaks do not overlap adjacent peaks. In order to obtain such spaced pulses, a relatively wide band width is required to accommodate many harmonics of the fundamental frequency detected by the servo transducer; and a relatively slow sampling rate, with a correspondingly small number of magnetic patterns on the disk, is obtained.

The rotatable data storage apparatus disclosed in U.S. Pat. No. 3,936,876 is an example of a magnetic track following servo system utilizing the tri-bit servo pattern. In the structure of this patent, a separate servo transducer effective on the lower side of a magnetic disk is used; and the servo transducer is mechanically coupled with a pair of data transducers effective on the upper surface of the disk. The servo circuitry disclosed in this patent includes a preamplifier receiving the servo signals from the servo transducer and supplying an output to a detector. The detector provides a position error signal the amplitude of which is dependent on the distance that the servo transducer is off of a guide path, and the detector includes a pair of demodulators that are responsive to the peaks of signals supplied from the servo transducer so as to provide the position error signal at the output of the detector. This position error signal is used by means of a compensator and a driver circuit so as to energize a voice coil which moves the servo transducer to correct its position.

Peak detection of a servo transducer output signal has also been used in connection with other servo patterns and in particular with a pattern in which similarly magnetized servo track portions of adjacent tracks are not in edge alignment radially of the disk and in particular in which short and long similarly magnetized servo track portions are centrally disposed radially of the disk. Since peak detection is used, the same disadvantages apply, namely, unduly wide band width with a great number of harmonics required to produce the distinctive signal peaks and a relatively slow sampling rate. One such system is disclosed in U.S. Pat. No. 3,534,344, and the position information is recorded in successive tracks on a separately dedicated disk. Each of the servo tracks contains the spaced set of paired flux reversals, and the sets of flux reversals repeat every other track so that one separately identifiable set of flux reversals will occur in the odd tracks and another separately identifiable set of flux reversals occurs in the even tracks. These are sensed by the servo transducer; and, when the servo transducer is exactly centered over adjacent odd or even tracks, the signal strength from the two adjacent tracks are equal. The peaks of the output signal of the servo transducer caused by adjacent tracks are integrated, and the integrated wave forms are then rectified by half-wave rectifiers and are then applied to peak detectors. Due to the use of these peak detectors, the peaks of the output signal of the transducer must be well spaced as above noted.

The transducer positioning systems of U.S. Pat. Nos. 3,893,180 and 3,959,820 also use the same servo pattern as is used by the apparatus of U.S. Pat. No. 3,534,344 in which similarly magnetized long and short servo track portions of adjacent servo tracks are centrally located with respect to each other. In the system of U.S. Pat. No. 3,893,180, the signal strength of each servo output response is first identified, and the peak amplitudes of the responses are thereafter separately measured and separate signals are produced indicative of the major peak amplitudes. The separate signals are thereafter combined so as to indicate whether the signal strength of either response dominates over the other. The servo responsive system of U.S. Pat. No. 3,959,820 analyzes the output servo signal and defines two separate data tracks for each and every individual track of position information traversed. The circuitry of this patent uses a positive peak detector and a negative peak detector for analyzing the servo transducer output signal. The same disabilities apply to the structures of these two patents, since they both rely on peak detection for determining the position of the servo transducer.

SUMMARY OF THE INVENTION

It is an object of the present invention to provide an improved servo system for moving a servo transducer onto a selected guide path on a magnetic disk using concentric servo tracks consecutive ones of which are differently encoded and alternate ones which are encoded similarly, with the servo system being such as to not require detection of individual peaks of the output signal from the servo transducer and in lieu thereof requiring only the fundamental and second harmonics of the output signal of the servo transducer for producing the position error signal utilizable for centering the servo transducer on a guide path.

In a preferred form, the servo system of the invention utilizes magnetic servo encoding of the type in which alternate short and long magnetic segments are centered from track to track, an automatic gain control amplifier for providing an analog output signal of the type picked up by a servo transducer on the servo encoding with the fundamental being constant, a squaring and frequency doubler circuit for producing a uniform frequency square wave signal of double the frequency of the fundamental of the analog signal picked up by the transducer, a filter connected with the amplifier for producing an analog double frequency signal based on the analog signal produced by the amplifier, a synchronous detector functioning as a multiplier for multiplying the double frequency square wave signal with the analog double frequency signal for thus producing a pulsating position error signal and filtering means for averaging the pulsating position error signal to provide a steady state position error signal for any particular position of the transducer over a pair of adjacent servo tracks.

BRIEF DESCRIPTION OF THE DRAWINGS

FIGS. 6A and 6B are diagrams showing the magnetic servo pattern in rectilinear form and concomitant voltage changes on various electrical lines of the position detection circuitry.

DESCRIPTION OF THE PREFERRED EMBODIMENT

Figure 1:
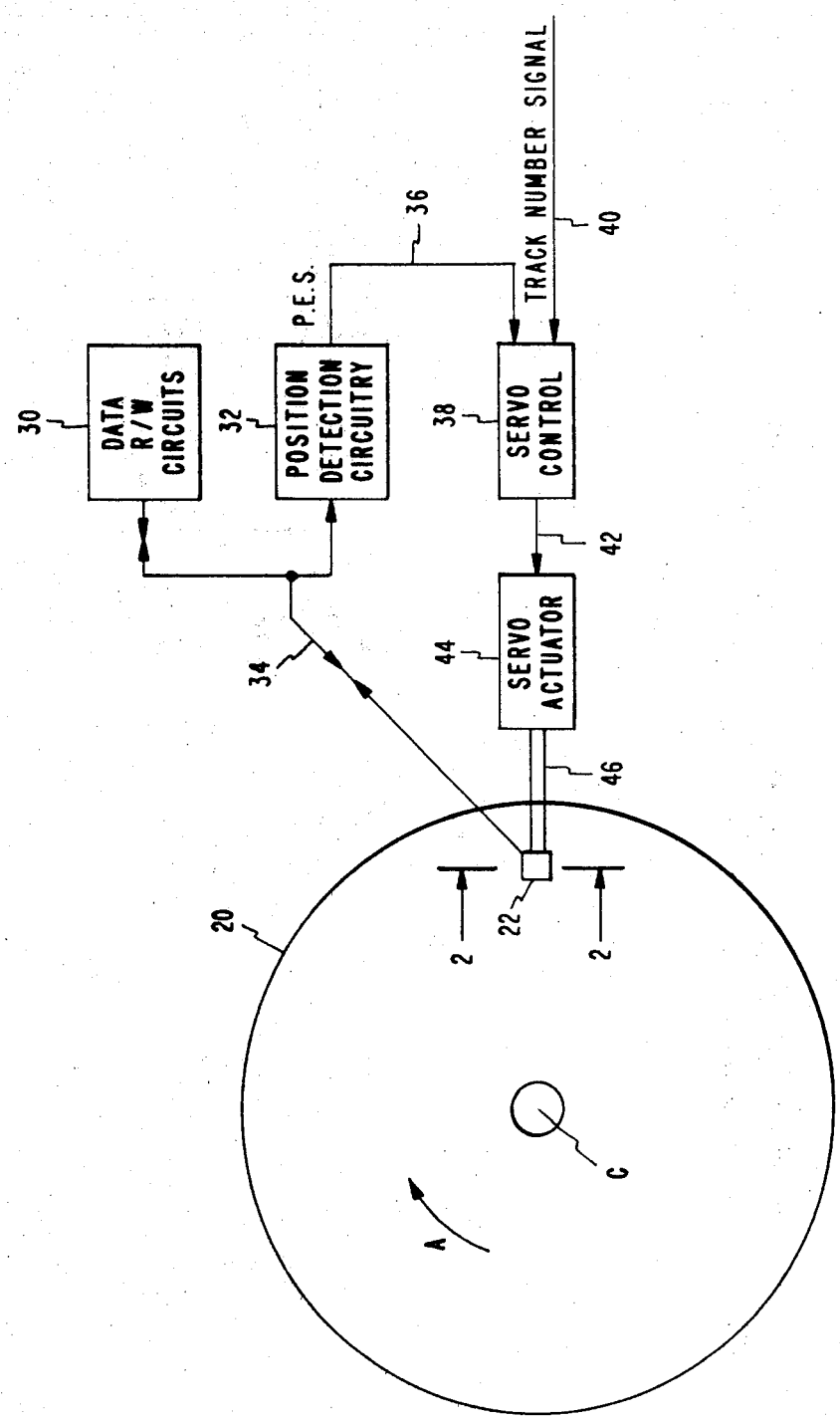
FIG. 1 is a diagram of the transducer positioning system of the invention and showing a magnetic disk, a servo transducer in data transferring relationship with the disk on one face of it, a servo actuator for mechanically moving the transducer radially of the disk and circuitry electrically connecting the transducer and servo actuator and including position detection circuitry providing a position error signal to a servo control electrically driving the servo actuator.
Figure 2:
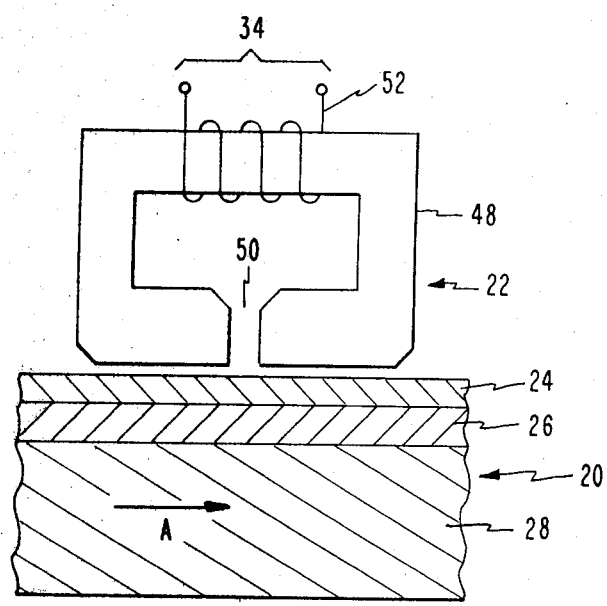
FIG. 2 is a fragmentary sectional view of the disk taken on line 2—2 of FIG. 1 and showing the transducer diagrammatically in elevation.

Referring to FIGS. 1 and 2, a magnetic disk 20 having a magnetic head or transducer 22 in close information transferring disposition with respect to one face of the disk is illustrated. The disk 20 is rotatably driven in direction A about its center C by any suitable driving mechanism (not shown), and the transducer 22 is movably disposed on the surface of the disk by any suitable guiding mechanism so that the transducer 22 may move radially of the disk 20 toward and away from the center C.

The disk 20 is of the buried servo information type disclosed in U.S. Pat. No. 3,404,392, for example, and comprises two magnetic layers of different coercivities, an upper data layer 24 and a lower servo layer 26 which are placed on a substrate 28. The disk may be of the flexible type with the substrate 28 in particular being flexible, and in this connection the substrate 28 may be of polyethylene terephthalate (Mylar ®) of about 0.075 mm thickness as is disclosed in U.S. Pat. No. 4,038,693. The disk 20 may or may not be enclosed in a more rigid jacket as is disclosed in this patent.

Figure 5:
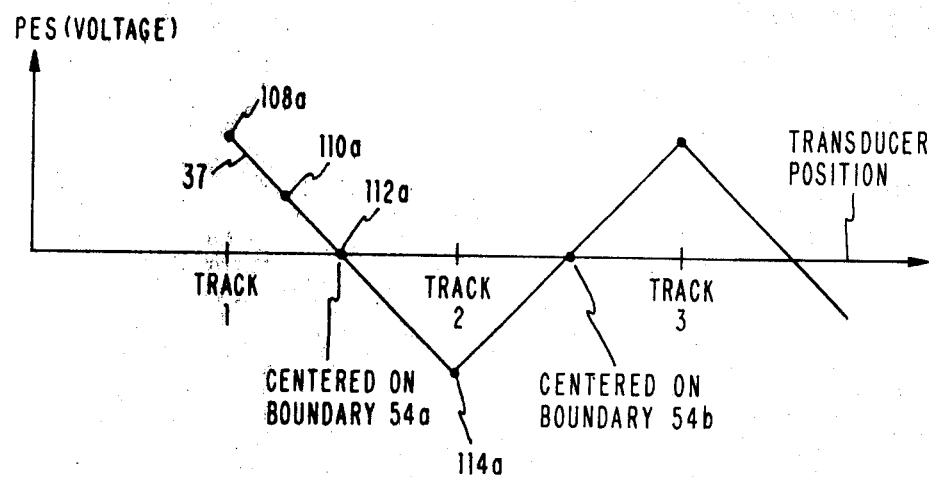
FIG. 5 is a diagram showing the variation of the position error signal with the position of the transducer radially of the disk.

The transducer positioning system of the invention as shown in FIG. 1 comprises data read/write circuits 30 and position detection circuitry 32 connected by means of line 34 with the transducer 22. The line 34 as shown in FIG. 1 is adapted to transmit information in both directions. The position detection circuitry 32 is connected by means of a line 36, which carries a position error signal (PES) 37 shown in FIG. 5, to a servo control 38. The line 36 constitutes an input to the servo control 38, and the servo control 38 has a second input line 40 which carries a track number signal for accessing the transducer 22 on the disk 20. The servo control 38 has an output line 42 connecting it to a servo actuator 44, and the servo actuator 44 has a mechanical link 46 connecting the servo actuator 44 mechanically with the transducer 22 so as to move the transducer 22 radially across the disk 20 in one direction or the other in accordance with the manner in which the servo actuator 44 is energized. The data R/W circuits 30, the servo control 38 and the servo actuator 44 are conventional, and therefore no further detailed description of these units will be given. The position detection circuitry 32 is shown in detail in FIG. 4. The shape of the position error signal 37 on line 36 and shown in FIG. 5 is conventional, and its generation by the position detection circuitry 32 (which embodies the gist of the invention) will be hereinafter described.

The transducer 22 is conventional and comprises a magnetic core 48 having a gap 50 therein and having a winding 52 wound thereon (see FIG. 2). The winding 52 terminates on the line 34.

The servo layer 26 is magnetically encoded with servo tracks 1, 2, 3, 4, etc., and the data layer 24 is magnetically encoded with data tracks a, b, c, etc. (see FIGS. 3, 6A and 6B). All of these tracks are concentric with the center C of the disk 20. The servo tracks 1, 2, 3, 4, etc. have boundaries 54a, 54b, 54c, etc. (which may be considered transducer guide paths) between them, and each of the data tracks a, b, c, etc. have center lines z. The servo tracks 1, 2, 3, 4, etc. are staggered radially of the disk 20 with respect to the data tracks a, b, c, etc., and the servo track boundaries 54a, 54b, etc. are therefore each coincident with one of the data track center lines z. Each of the data tracks a, b, c, etc. when encoded with data has a series of closely spaced radially extending magnetic transitions 56. The outermost servo track 1 is formed by relatively short designations in the form of short magnetized segments 58 and relatively long designations in the form of long magnetized segments 60 that are disposed alternately in the track 1 to form the track 1. All of the segments 58 are magnetized in the same direction (such as opposite to direction A), and all of the segments 60 are magnetized in the same direction which is opposite to the direction of magnetization for the segments 58. Thus the segments 58 and 60 form the positive magnetic transitions 62 and the negative transitions 64 which appear alternately in the track 1 and extend radially of the disk 20. The alternate odd tracks 3, 5, 7, etc. all are formed in the same manner as the track 1 and have the same magnetized segments 58 and 60 and the same magnetic transitions 62 and 64.

Figure 3:
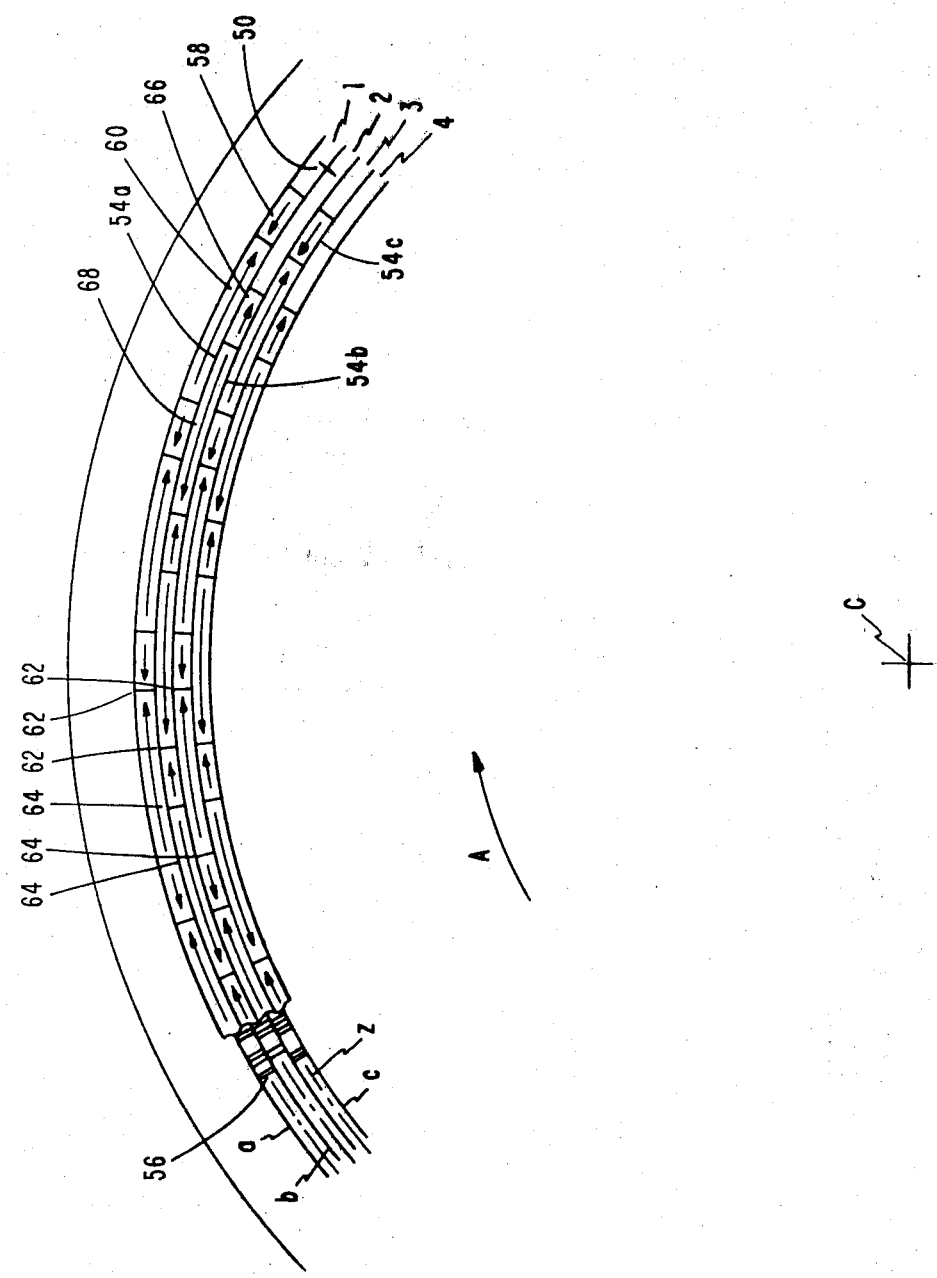
FIG. 3 is a face view of the magnetic disk showing the magnetic servo pattern of magnetic segments on the face of the disk which is in data transferring relationship with the transducer.

The servo track 2 lying between the similarly formed servo tracks 1 and 3 is formed by the short designations in the form of short magnetized segments 66 and the long designations in the form of long magnetized segments 68. The short segments 66 are magnetized in a direction opposite to the direction of magnetization of the short segments 58, and the long segments 68 are magnetized in a direction opposite to the direction of magnetization of the long segments 60. The segments 66 and 68 thus have the radial magnetic transitions 62 and 64 between them as shown in FIGS. 3 and 6. Each of the short segments 66 of the servo track 2 is centrally located with respect to a long segment 60 of the servo track 1 at the boundary 54a between the two servo tracks and radially of the disk 20, and each of the short segments 58 is centrally located with respect to one of the long segments 68 of the servo track 2 at the boundary 54a and radially of the disk 20 (see FIG. 3). Thus, as the disk 20 rotates in the direction A, the servo tracks 1 and 2 at the boundary 54a will produce consecutively two positive magnetic transitions 62 followed by two negative transitions 64 along any particular radius of the disk 20. The alternate even tracks 4, 6, 8, etc. are formed by the same magnetic segments 66 ad 68 as the track 2. Thus, the alternate tracks 3, 5, 7, etc. produce the same transitions as does the track 1, and the alternate tracks 4, 6, 8 etc. produce the same transitions as servo track 2. For satisfactory operation with respect to the transducer positioning system of FIG. 1, the long segments 60 may be three times as long, for example, as the short segments 58 in any of the tracks 1, 3, 5, 7, etc.; and the long segments 68 may be three times as long as the short segments 66 in any of the tracks 2, 4, 6, etc. It will furthermore be noted that the edges of each of the short segments 58 are located on the same radial lines of the disk 20 as the edges of corresponding short segments in the other odd tracks, and the same is true of the edges of the short segments 66.

Figure 4:
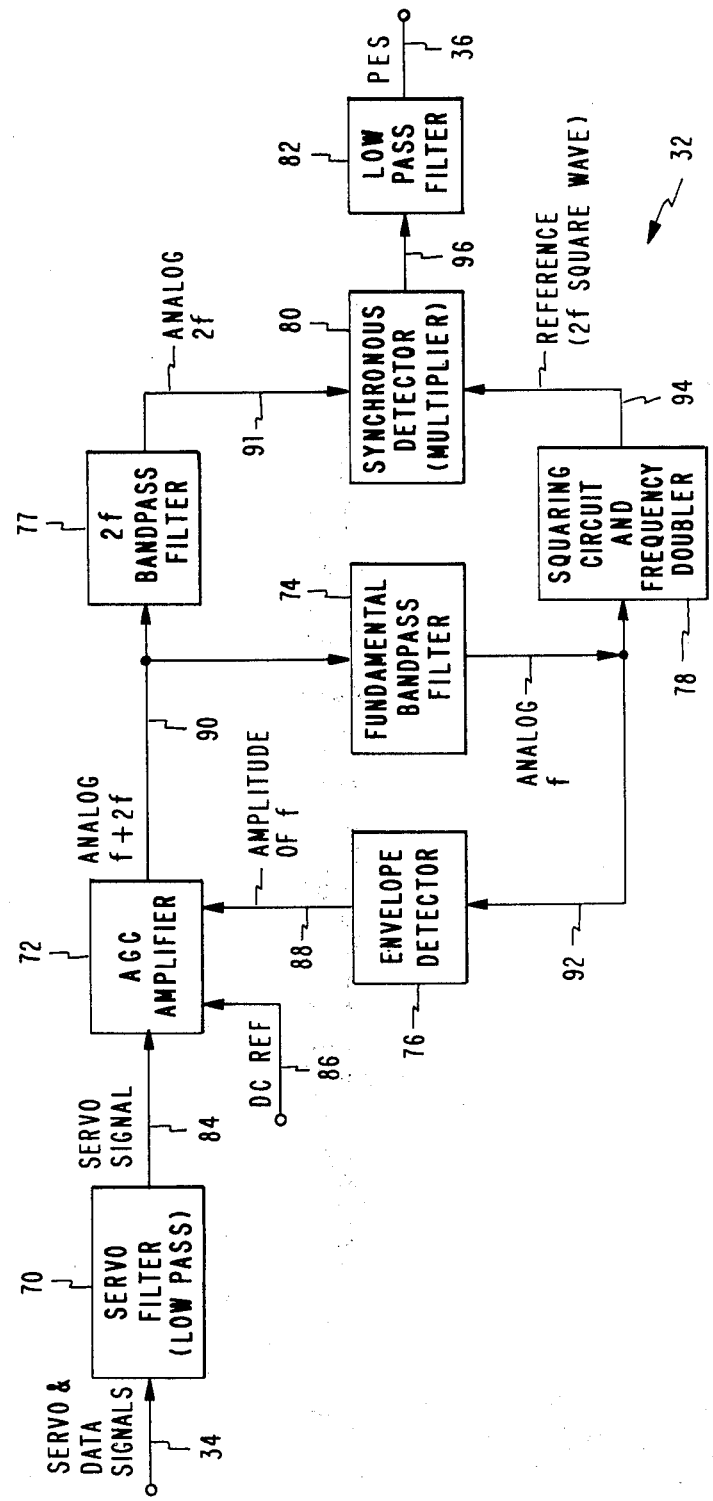
FIG. 4 is a diagram of the position detection circuitry.

The position detection circuitry 32 as shown in FIG. 4 comprises a low pass servo filter 70, an automatic gain control amplifier 72, a fundamental (f) bandpass filter 74, an envelope detector 76, a second harmonic (2f) band pass filter 77, a squaring circuit and frequency doubler 78, a synchronous detector and multiplier 80, and a low pass filter 82. The servo filter 70 has the line 34 as an input and provides a servo signal output on line 84 which constitutes an input to the AGC amplifier 72. The AGC amplifier 72 has two additional inputs which are the lines 86 and 88. The line 86 is supplied with a DC reference voltage so that the amplifier 72 may function as intended, and the line 88 constitutes an output of the envelope detector 76 and carries an "amplitude of fundamental" signal. The amplifier 72 has the line 90 as an output which carries an "analog f+2f" signal, and the line 90 constitutes inputs to the filters 74 and 77. A line 91 carrying the signal "analog 2f" connects the output of the filter 77 with the synchronous detector 80. The filter 74 has the output line 92 carrying a signal "analog f", and the line 92 constitutes an input to the squaring circuit 78 and envelope detector 76. The squaring circuit 78 has the line 94 as an output which carries a signal "reference, 2f square wave", and the line 94 constitutes a second input to the synchronous detector 80. A line 96 constitutes the output of the synchronous detector 80 and an input to the low pass filter 82.

In operation, the data on the data tracks a, b, c, etc. in the form of the transitions 56 may be written using the conventional data R/W circuits 30. The data is transmitted from the circuit 30 through the line 34 to the transducer 22, and the encoding of the data is accomplished as the disk 20 is driven in direction A.

The servo information in the form of the magnetized segments 58, 60, 66 and 68 has been previously written on the disk 20 using any suitable magnetic encoder means, and the position detection circuitry 32 is used as will be described to cause the transducer gap 50 to be exactly in alignment or centered with the data tracks a, b, c, etc. as the data is written on these tracks. Likewise, the position detection circuitry 32 assures that the transducer gap 50 is exactly centered on the data tracks a, b, c, etc. when a reading of the data is accomplished. In this case, the data information passes through the line 34 to the circuits 30 for any suitable recording or other usage.

In particular, the position detection circuitry 32 provides the position error signal 37 on line 36 that is triangular and varies in magnitude and sign depending on the positioning of the gap 50 with respect to boundaries 54a, 54b, 54c, etc. between adjacent servo tracks and with respect to the corresponding data tracks a, b, c, etc. The gap 50 is exactly positioned over the data track a for example when it is centered on the corresponding boundary 54a between servo tracks 1 and 2. The same is true with respect to the boundaries 54b, 54c, etc. and the data tracks b, c, etc. As will be observed from FIG. 5, the position error signal 37 is zero when the transducer 22 and its gap 50 is centered on the boundary 54a and is zero when the transducer and gap are centered on the boundary 54b. The position error signal 37 is maximum when the transducer 22 and its gap 50 are centered over servo track 1 and over servo track 2, but the position error signal 37 is at a positive value in the former case and is a negative value in the latter case. The position error signal increases and decreases in exactly the same manner when the transducer 22 and the gap 50 move radially across the disk 50 so as to traverse successive servo track boundaries 54c, etc. and successive data tracks c, etc. As has been previously mentioned, the position error signal 37 in changing as shown in FIG. 5 is conventional and operates in a conventional manner on the servo control 38 and servo actuator 44 so as to move the transducer 22 and gap 50 in exact alignment with the boundaries 54a, 54b, 54c, etc. and data tracks a, b, c, etc. when the position error signal has a finite voltage level. When the position error signal is zero, the transducer 22 and gap 50 are exactly centered on one of the boundaries 54a, 54b, 54c, etc. and on one of the data tracks a, b, c, etc., and the transducer 22 is then in position to either read or write data on one of the data tracks a, b, c, etc.

When it is desired to access the transducer 22 to a given data track, a track number signal is supplied on line 40 to the servo control 38, and the servo control 38 functions as is well known and conventional to accomplish the positioning of the transducer 22 on the exact data track and servo track boundary desired. The position detection circuitry is then effective to exactly align the transducer 22 and its gap 50 with the boundary and data track.

The position detection circuitry 32 produces the position error signal 37 shown in FIG. 5 which is effective to move the transducer 22 in one direction or the other to center the transducer on the desired data track particularly by utilizing the second harmonic of the fundamental signal produced by the transducer 22 when it is not exactly centered on the desired data track and servo track boundary.

Assuming that a reading operation is taking place, the line 34 carries a data signal from one or more of the data tracks a, b, c, etc. and also carries a servo signal generated by the tracks 1, 2, 3, etc. The data transitions 56 are very much more closely spaced than are the servo transitions 62 and 64; the data signal is at a much higher frequency than the servo signal; and the servo filter 70 is provided for blocking such high frequency data signals. In the event that the data is being written by the circuits 30 rather than being read, the filter 70 will function in the same manner to block any such high frequency data signals from the circuitry 32. Incidentally, the data is purposely coded in such a way so that it does not have the low frequency content that would be admitted into the circuitry 32, and only the fundamental and second harmonic servo signals of low frequency are used by the circuitry 32. The servo filter 70 thus assures that only the low frequency servo signals enter the circuitry 32.

The automatic gain control amplifier 72 particularly in functioning in connection with the fundamental filter 74 and the envelope detector 76 regulates the analog signal from the head 22 to a predetermined amplitude of the fundamental 98a (see FIG. 6A). The output of the AGC amplifier 72 on its output line 90 is the analog signal with the fundamental as so regulated, such as the signals 98, 100, 102 and 104 that exist as the head 22 moves inwardly on the disk 20 from directly over servo track 1 to a position directly over servo track 2. FIG. 6A shows the servo tracks 1, 2, 3 and 4 in rectilinear form and also shows the signals 98, 100, 102 and 104 which are on line 90 caused by the magnetic transitions 62 and 64 as the disk 20 rotates in direction A and as the transducer moves inwardly of the disk 20. As will be seen from FIG. 6A, the amplitude of the fundamental 98a remains the same as the transducer moves from a position directly over the track 1 to a position directly over track 2. Each of the signals 98, 100, 102 and 104, in addition to the fundamental 98a, includes a second harmonic, these harmonics being the signals 98b, 100b, 102b and 104b. As will be observed from FIG. 6A, these second harmonic signals vary greatly, the second harmonic signal 98b being a maximum, the signal 100b being of less magnitude and the signal 102b being zero. The signal 104b is equal to the signal 98b but is of opposite polarity. It will be observed that the zero points of the signals 98, 100, 102 and 104 are in alignment with the centers of the segments 58, 60, 66 and 68 as the disk 20 rotates. The signal 98 applicable to the track 1 also applies to the signal on line 90 for the other odd servo tracks, and the signal 98 applicable to track 2 also applies to the other even servo tracks, as will be understood. It will be noted in particular that when the transducer 22 is centered over the boundary 52a (in alignment with data track a) only the fundamental signal 98a exists on line 90 and the second harmonic has an amplitude of zero.

The fundamental band pass filter 74 is so constructed that it passes only the fundamental signal 98a so that only this signal appears on line 92. The envelope detector 76 detects only the amplitude of the fundamental 98a and thus produces on its output line 88 a signal indicative of the amplitude of the fundamental. The AGC amplifier 72 is so constructed that it compares the signal on the line 88 with a fixed DC reference voltage applied to the line 86 and adjusts the gain in the amplifier 72 to force the amplitude of the fundamental 98a on line 88 to be equal to the DC voltage on line 86.

The squaring circuit and frequency doubler 78 is so constructed that it uses the fundamental signal 98a on line 92 and provides a double frequency ($2f$) square wave signal 106 (see FIG. 6B) on its output line 94.

The analog $f + 2f$ signal on line 90 (the signals 98, 100, 102 or 104 for example) is applied onto the $2f$ band pass filter 77 which functions to pass only the corresponding analog second harmonic signal, such as signals 98b, 100b, 102b and 104b, to the synchronous detector 80. The synchronous detector 80 thus has the square wave signal 106 and the analog $2f$ signals 98b, 100b, 102b or 104b applied to it and is constructed and functions to multiply these two signals. This multiplied signal is effective on the line 96 and constitutes the pulsating positive signals 108 and 110, the zero signal 112 and the pulsating negative signal 114 (see FIG. 6B). These signals correspond respectively with the second harmonics 98b, 100b, 102b and 104b for the same positions of the head 22 on the servo tracks 1, 2, 3, etc. and may be considered as pulsating position error signals when the head 22 is not centered on a data track.

The low pass filter 82 has the function of providing the low frequency averages of the varying signals 108, 110, 112 and 114, these being the average signals 108a, 110a, 112a and 114a (see FIG. 6B). These average signals 108a, 110a, 112a and 114a constitute the PES signal 37 on the line 36. The signal 112 and the signal 112a for the condition in which the transducer is directly over the boundary 54a are coincident and are both zero as will be seen from FIG. 6B. The signal 110a is of course greater than the zero signal 112a, and the signal 108a (for the condition in which the transducer is directly over track 1) is at a still higher magnitude. The signal 114a is equal to the signal 108a but is of opposite polarity and is for the condition in which the transducer 22 is directly over track 2. The PES signal 37 thus varies from a positive to a negative value as shown in FIG. 5, with the amplitudes varying as shown for the signals 108a, 110a, 112a and 114a in FIG. 6B.

It will be assumed in the following mathematical derivation that the gap 50 is positioned partially over servo track 1 and partially over servo track 2, and the results would of course be similar if the transducer gap 50 were positioned over other adjacent servo tracks. Mathematically, the fundamental and second harmonic for track 1 (or other odd servo track) can be given by:

$$V_1 = A_1 \sin \omega t + A_2 \sin 2\omega t \qquad (1)$$

And for track 2 (or even servo tracks) by:

$$V_2 = A_1 \sin \omega t - A_2 \sin 2\omega t \qquad (2)$$

If the transducer 22 reads $\alpha$ as the fraction read of track 1 and $(1 - \alpha)$ as the fraction read of track 2, the voltage across transducer winding 52 is:

$$V_\alpha = \alpha V_1 + (1-\alpha)V_2 \quad (3)$$

or $$V_a = A_1 \sin \omega t + [\alpha A_2 - (1-\alpha)A_2] \sin 2\omega t \quad (4)$$

or $$V_a = A_1 \sin \omega t + (2\alpha - 1)A_2 \sin 2\omega t \quad (5)$$

The above equation number (5) indicates that the amplitude and phase of the fundamental 98a ($A_1$ in the equation) stays constant regardless of the position that the transducer 22 has over the servo tracks. This equation also indicates that the phase of the second harmonic is constant and that the amplitude $[(2\alpha-1)A_2]$ of the second harmonic is directly related to the position of the head 22 over the servo tracks. In particular, the amplitude of the second harmonic is zero when the head 22 is positioned directly over a servo track boundary 54a, 54b, etc. Thus if the fundamental is held constant, the coefficient $[(2\alpha-1)A_2]$ of the second harmonic represents the position error signal 37. The synchronous detector 80 acting at the frequency of the second harmonic (from line 94) generates the coefficient $[(2\alpha-1)A_2]$, the position error signal 37.

Advantageously, the transducer positioning system of the invention requires a low harmonic content. In contrast with prior systems using peak detection of magnetic transition induced signals, the system of the invention only requires the fundamental and second harmonic of signals induced in a transducer by a magnetic servo pattern. This being true, the band of frequencies detected may be quite narrow, and the amount of interference in the servo system due to data signals and electrical noise is significantly reduced. The system of the invention is very effective with a distance separation between the transducer and the magnetic servo pattern, since the second harmonic is the highest harmonic that is necessary for operation. When there is a distance separation between the transducer and the servo pattern, the fundamental may be expected to be detected quite easily with a high magnitude of signal; and likewise the second harmonic, although being quite materially reduced in magnitude of signal, is nevertheless of sufficient magnitude to utilize. Higher harmonics are however reduced even further in magnitude of detection and therefore cannot be considered useful as a practical matter with this distance separation. Due to the lower number of harmonics required with the system of the invention, the fundamental can be higher in magnitude than that using a tri-bit servo encoding, for example. If a narrower band width is not required, a more frequent sampling of servo information by the transducer may be utilized affording greater accuracy of positioning of the transducer with reductions in lengths of the magnetic segments. It will be noted that with the prior tri-bit servo encoding, it is possible to secure only one sample of transducer position per fundamental cycle. However, with the present invention, it will be noted that one sample per one-half cycle of second harmonic or four samples for a complete cycle of fundamental are obtained. The system used in connection with the servo encoding of FIGS. 3, 6A and 6B is essentially insensitive to reasonable phase error, such as phase errors produced by inexact encoding of the magnetic segments and by possible inefficiencies of the synchronous detector 80.

Although the invention has been described in connection with the buried servo information layer 26 (located just beneath the data layer 24), the system may also be used in connection with a so called "read through" servo information layer. In this case, the servo information pattern would be disposed on the bottom of the disk 20; and the transducer 22 would be relied upon to read the servo information through the substrate 28. Since only the second harmonic is required for successful operation of the system, the system will function satisfactorily with such "read through" servo encoding. Also, if desired, the system may be used in connection with servo encoding applied and used separately from a data layer. In this case, the servo layer 26 could be disposed on the bottom of the disk 20, and a separate magnetic transducer could be used on the bottom surface of the disk 20 and in substantial contact with the servo encoding on a magnetic layer. Although the disk 20 has been described as a flexible disk, it is obvious that the invention may also be used in connection with a rigid disk in which the servo layer is disposed just beneath the data layer as shown in FIG. 2 or is disposed on the bottom of the disk, using a separate servo transducer. Although the two layers 24 and 26 are shown on the same disk 20, it is obvious that a separate disk may be used for holding the servo information while the data is on an attached other disk. In this case, the servo transducer and the data transducer would be ganged to move together, such as is shown in U.S. Pat. No. 3,534,344.

Although the continuous servo tracks 1, 2, 3, 4, etc. have been disclosed, it is obvious that the transducer positioning system of the invention may be used with servo information being disposed only in sectors on a magnetic disk, between alternating sectors of data information. This is so called "sector servoing", and the apparatus for detecting the sector servo information is conventional.

Although the circuit 78 has been disclosed as providing the square wave signal 106, this circuit could be modified to instead provide a uniform, double frequency sine wave signal in lieu of the square wave signal 106. In this case, the synchronous detector 80 produces on the line 96 a somewhat different wave form than the wave forms 108, 110 and 114; however, the low pass filter 82 will still have the effect of providing the average PES signals 108a, 110a, 112a and 114a as shown in FIG. 6B.

Another modification of the disclosed system that may be made is the omission of the filter 77. In this case, the analog $f+2f$ signal is applied on to the synchronous detector 80; and the output of the synchronous detector 80 in this case, when its output is averaged by the low pass filter 82, is the same PES signals 37 or 108a, 110a, 112a and 114a.

Another modification that may be made is the omission of the filter 74. In this case, the amplifier 72 will regulate the $f+2f$ signal rather than the fundamental; however, this makes only a relatively small difference when the second harmonic content of the $f+2f$ wave is low, as is true with the present invention. In this case, the frequency doubler circuit 78 will operate on the $f+2f$ wave which has the same zero crossings as the fundamental so that the square wave 106 with the correct phasing is still produced by the circuit 78.

The short magnetic segments 58 and 66 are shown centrally located (on a disk radius or radial line) with respect to the adjacent long magnetic segments 60 and 68 in adjacent tracks; however, the staggering could be otherwise, with each of the short segments being closer to one end than to the other end of an adjacent long segment in an adjacent track. This would have the same effect as the phase errors previously mentioned which are accommodated by the present system (with however some small detriment to the operation of the system).

Figure 7:
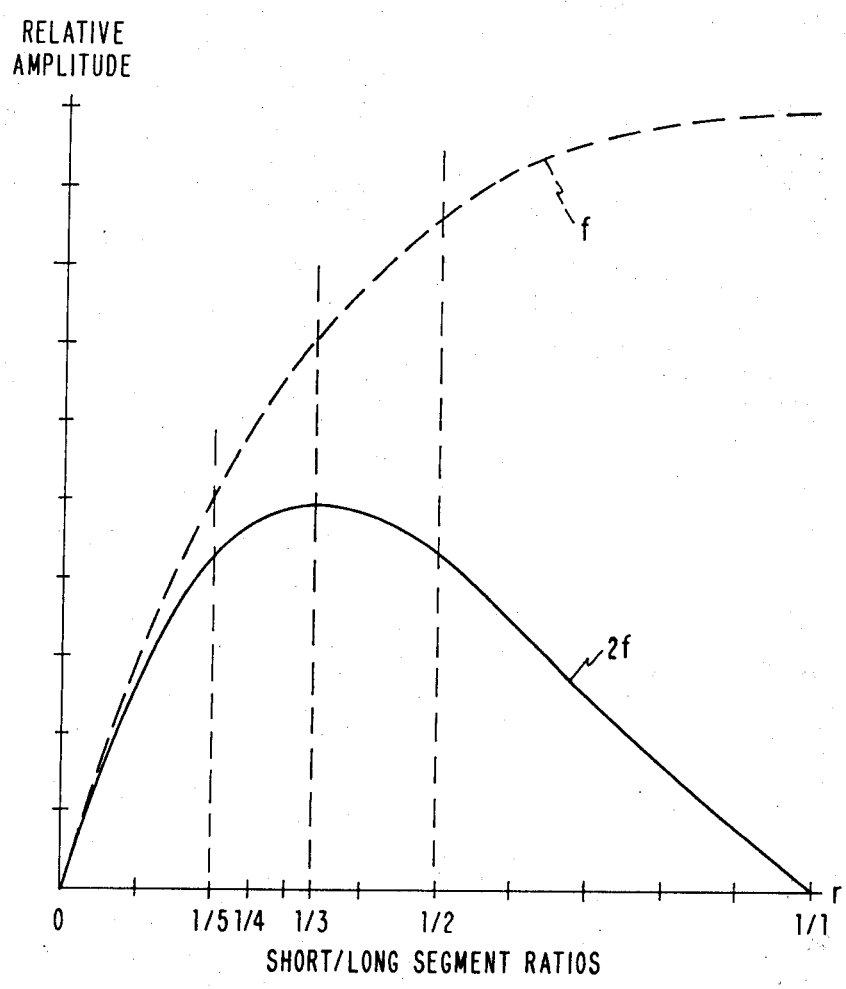
FIG. 7 is a diagram showing the variation of the length ratio of the magnetic segments that is permissible with the present invention.

Although the lengths of the short and long magnetic segments 58, 60, 66 and 68 have been illustrated to be in the ratio of 1 to 3, this ratio could be changed. Ratios of 1:2 to 1:5, for example, would also be workable. This is illustrated by referring to FIG. 7. FIG. 7 illustrates that a 1 to 3 ratio generates the maximum amount of second harmonic signal but that the other ratios just mentioned provide sufficient second harmonic amplitude. FIG. 7 also shows the amount of fundamental generated in each case. Since the fundamental amplitude is generally larger than the harmonic, the actual amplitude of the fundamental is not too important as long as it remains sufficiently above zero, as it does for all of the ratios from 1:5 to 1:2. The fundamental has a reduced but sufficient amplitude for the 1:5 ratio in particular.

Having thus described my invention, what I claim as new, and desire to secure by Letters Patent is:

1. Apparatus for generating an indication of position with respect to a predetermined path, comprising:
    first and second tracks adjacent opposite sides of said path, each of said tracks comprising a plurality of designations of a first type interrupted by designations of a second type which have different lengths than the designations of the first type;
    transducing means for detecting said designations of said tracks so as to provide a composite output signal which includes a fundamental signal and a harmonic signal wherein the amplitude of the harmonic signal varies as the transducer is moved from one side of said path to the other side of said path, and
    means providing a signal indicative of the amplitude of said harmonic as the harmonic changes with movement of said transducing means across tracks so as to thereby indicate the position of said transducing means with respect to said tracks.

2. Apparatus as set forth in claim 1 in which said harmonic and said signal indicative of the amplitude of said harmonic are both zero when said transducing means is centered over said path.

3. Apparatus as set forth in claim 1 in which said first track comprises designations of said first type interrupted by relatively short designations of said second type and said second track comprises designations of said second type interrupted by relatively short designations of said first type and said designations of said first type in said second track appearing opposite said designations of said first type in said first track.

4. Apparatus as set forth in claim 1 in which said first track comprises designations of said first type interrupted by relatively short designations of said second type and said second track comprises designations of said second type interrupted by relatively short designations of said first type with said designations of said first type in said second track appearing opposite said designations of said first type in said first track,
    said designations of said first type constituting magnetic segments magnetized in a certain direction and said designations of said second type constituting magnetic segments magnetized in the opposite direction.

5. Apparatus for generating an indication of position with respect to a predetermined path, comprising:
    a first track adjacent one side of said path comprising long magnetic segments magnetized in a first direction interrupted by short magnetic segments magnetized in the opposite second direction,
    a second track adjacent the other side of said path and comprising long magnetic segments energized in said second direction interrupted by short magnetic segments magnetized in said first direction, said short magnetic segments in said second path appearing opposite said long magnetic segments in said first path,
    a magnetic head for detecting said magnetic segments as the segments move with respect to the head whereby the head produces an output signal comprising a fundamental signal and a second harmonic signal which varies in amplitude as said head moves across said tracks, and
    means for determining when the amplitude of said second harmonic is at a predetermined value so as to thereby determine when said head has moved to a predetermined position with respect to said two tracks.

6. Apparatus as set forth in claim 5 in which said determining means determines when the amplitude of said second harmonic signal is zero so as to thereby determine when said head is centered over said path.

7. Apparatus as set forth in claim 6 in which said tracks are disposed in circular fashion on the face of a rotatable magnetic disk, said short segments of said first track being centered on radial lines of said disk with respect to said long segments of said second track and said short segments of said second track being centered on radial lines of the disk with respect to said long segments of said first track.

8. Apparatus as set forth in claim 6 including means for providing a reference signal at the frequency of but excluding the amplitude of said second harmonic and means for providing said second harmonic signal exclusive of said fundamental signal, said determining means including means for multiplying said reference signal and said second harmonic signal exclusive of said fundamental signal to produce a resultant signal the amplitude of which is indicative of the position of said head on said tracks.

9. Apparatus as set forth in claim 8,
    said means for providing said second harmonic signal including a band pass filter having the output signal exclusive of said fundamental signal of said head applied to it and filtering out said fundamental signal,
    said means for providing said reference signal including a fundamental filter having said output signal of said head applied to it and filtering out the second harmonic signal to provide said fundamental signal as an output and a frequency doubler circuit having said fundamental signal applied to it and doubling the signal so as to provide the second harmonic reference signal.

10. Apparatus as set forth in claim 8, said resultant signal constituting a pulsating unidirectional signal, said apparatus also including averaging means for averaging said resultant signal so as to produce a steady state position error signal for any one position of said head on said tracks and either on said path or spaced therefrom.

11. Apparatus for generating an indication of position with respect to a predetermined circular path on a magnetic disk which is encoded with a first track adjacent one side of said path comprising long magnetic segments magnetized in a first direction interrupted by short magnetic segments magnetized in the opposite second direction and a second track adjacent the other side of said path and comprising long magnetic segments magnetized in said second direction interrupted by short magnetic segments magnetized in said first direction, said short magnetic segments in said second path appearing opposite said long magnetic segments in said first path, said apparatus comprising:

transducing means for detecting said magnetic segments as the segments move with respect to the transducing means whereby the transducing means produces a composite output signal comprising a fundamental signal and a second harmonic signal which varies in amplitude as said transducing means moves across said tracks, and means producing a unidirectional output signal, the amplitude of which varies with the amplitude of said second harmonic signal and which thus indicates by its amplitude the position of said transducing means with respect to said tracks.

12. Apparatus as set forth in claim 11, said unidirectional output signal constituting a pulsating signal, said apparatus also including means for averaging said unidirectional output signal to produce a steady state unidirectional position error signal indicative of the position of said transducing means with respect to said tracks.

13. Apparatus as set forth in claim 11, said means for producing said unidirectional signal including a frequency doubler circuit connected with said transducing means for producing a uniform amplitude and frequency reference signal at double the frequency of said fundamental signal, a filter circuit having the output of said transducing means applied to it and producing the second harmonic signal which varies in amplitude with movement of the transducing means across said tracks, and a multiplier circuit having said reference signal and said second harmonic signal produced by said filter circuit applied to it for thereby producing the unidirectional output signal, the amplitude of which varies with the amplitude of said second harmonic signal and which thus indicates by its amplitude the position of said transducing means with respect to said tracks.

14. Apparatus as set forth in claim 13, said unidirectional output signal constituting a pulsating signal, said apparatus also including means for averaging said unidirectional output signal of said multiplier circuit so as to produce a unidirectional steady state position error signal indicative of the position of said transducing means with respect to said tracks.

15. In a method for generating an indication of position with respect to a predetermined path, the steps which comprise:

providing first and second tracks adjacent opposite sides of said path, each of said tracks comprising a plurality of designations of a first type interrupted by designations of a second type which have different lengths than the designations of the first type, detecting said designations by means of transducing means as said tracks move with respect to said transducing means so as to provide a composite output signal which includes a fundamental signal and a harmonic signal wherein the amplitude of the harmonic signal varies as the transducer moves across said tracks, and providing a steady state position error signal the amplitude of which varies with the amplitude of said harmonic signal so as to thereby indicate the position of said transducing means with respect to said tracks.

16. In a method for generating an indication of position with respect to a predetermined path, the steps which comprise:

providing a first track adjacent one side of said path comprising long magnetic segments energized in a first direction interrupted by short magnetic segments magnetized in the opposite second direction, providing a second track adjacent the other side of said path and comprising long magnetic segments energized in said second direction interrupted by short magnetic segments magnetized in said first direction, said short magnetic segments in said second path appearing opposite said long magnetic segments in said first path, detecting said segments by means of a transducing means positioned in information transferring relationship with respect to said tracks to produce a composite signal comprising a fundamental signal and a second harmonic signal which varies in amplitude as said transducing means moves across said tracks, and providing a steady state position error signal, the amplitude of which varies with the amplitude of said second harmonic signal so as to thereby indicate the position of said transducing means with respect to said tracks.

17. In a method for generating an indication of position with respect to a predetermined circular path on a magnetic disk, the steps which comprise:

providing a first circular track on said disk adjacent one side of said path comprising long magnetic segments energized in a first direction interrupted by short magnetic segments magnetized in the opposite second direction, providing a second circular track adjacent the other side of said path and comprising long magnetic segments energized in said second direction interrupted by short magnetic segments magnetized in said first direction, said short segments of said first track being centered on radial lines of said disk with respect to said long segments of said second track and said short segments of said second track being centered on radial lines of the disk with respect to long segments of said first track, detecting said magnetic segments by means of a transducer positioned in information transferring relationship with respect to said tracks as said disk and the segments rotate with respect to the transducer whereby the transducer produces an output signal comprising a fundamental signal and a second harmonic signal which varies in amplitude as said transducer moves across said tracks, producing a uniform frequency and amplitude reference signal at twice the frequency of said fundamental signal, producing an analog signal at the frequency and with the amplitude of said second harmonic signal, multiplying said reference signal and said analog signal together to thereby produce a pulsating unidirectional output signal, the amplitude of which varies with the amplitude of said second harmonic signal, and averaging said pulsating signal so as to thereby produce a steady state signal which thereby constitutes a position error signal indicating the position of said transducer with respect to said tracks.

* * * * *